United States Patent

Sulzyc et al.

[11] Patent Number: 5,551,734
[45] Date of Patent: Sep. 3, 1996

[54] CONNECTION ASSEMBLY FOR THE CONNECTION OF A PIPE TO A PLASTIC HOUSING

[75] Inventors: George Sulzyc, Eppelheim; Horst Venghaus, Walldorf, both of Germany

[73] Assignee: Grau GmbH, Heidelberg, Germany

[21] Appl. No.: 493,362

[22] Filed: Jun. 21, 1995

[30] Foreign Application Priority Data

Jun. 21, 1994 [DE] Germany .............................. 44 21 574.6

[51] Int. Cl.⁶ ...................................................... F16L 55/00
[52] U.S. Cl. ............................ 285/174; 285/175; 285/281; 285/906; 285/921
[58] Field of Search ..................... 285/278, 281, 285/174, 921, 14, 272, 175, 906

[56] References Cited

U.S. PATENT DOCUMENTS

| | | | |
|---|---|---|---|
| 2,452,219 | 10/1948 | Bergvall et al. | 285/921 X |
| 3,294,359 | 12/1966 | Bauer | 251/148 |
| 4,214,586 | 7/1980 | Mericle | 285/921 X |
| 4,451,069 | 5/1984 | Melone | 285/921 X |
| 4,667,062 | 5/1987 | Espevik | 285/272 X |
| 4,712,809 | 12/1987 | Legris | 285/281 X |
| 4,905,766 | 3/1990 | Dietz et al. | 169/91 |
| 5,058,927 | 10/1991 | Miwa | 285/14 X |
| 5,219,188 | 6/1993 | Abe et al. | 285/93 |

FOREIGN PATENT DOCUMENTS

| | | | |
|---|---|---|---|
| 0223942 | 9/1986 | European Pat. Off. . | |
| 360634 | 3/1990 | European Pat. Off. | 285/921 |
| 0499886 | 2/1992 | European Pat. Off. . | |
| 710589 | 9/1941 | Germany | 285/921 X |
| 3317630 | 5/1983 | Germany . | |
| 3443079 | 7/1984 | Germany . | |
| 3723223 | 7/1987 | Germany . | |
| 4237219 | 11/1992 | Germany . | |
| 4305609 | 2/1993 | Germany . | |
| 4310628 | 10/1993 | Germany | 285/921 X |
| 2181806 | 4/1987 | United Kingdom | 285/281 |
| 2206661 | 1/1989 | United Kingdom | 285/921 |
| 3956 | 5/1989 | WIPO | 285/921 |

*Primary Examiner*—Dave W. Arola
*Attorney, Agent, or Firm*—Hopkins & Thomas

[57] ABSTRACT

A connection piece (2) for the connection of a pipe (19) to a plastic housing (1) of a valve, comprises a threaded plug (4) made of metal, which is arranged in a plastic sleeve (3) of the housing (1). At least one circumferential projection (9) and one corresponding circumferential groove (10) are provided between the threaded plug (4) and the plastic sleeve (3). The threaded plug (4) is secured only in an axial manner and freely rotatable beared in the plastic sleeve (3) by the connection of the circumferential projection (9) and the corresponding circumferential groove (10). The threaded plug (4) is provided protruding the plastic sleeve (3) to the outside and comprises a gripping surface (17) for the supply of a tool.

11 Claims, 3 Drawing Sheets

CONNECTION ASSEMBLY FOR THE CONNECTION OF A PIPE TO A PLASTIC HOUSING

FIELD OF THE INVENTION

The invention refers to a connection assembly for the connection of a pipe to a plastic housing of a valve, comprising a threaded plug made of metal, which is arranged in a plastic sleeve of the housing, whereby at least one circumferential projection and one corresponding circumferential groove are provided between the threaded plug and the plastic sleeve.

BACKGROUND OF THE INVENTION

Especially with respect to valves, but also with respect to other aggregates of vehicles, it is necessary to provide a screw connection between a pipe and a plastic sleeve of the housing of the valve. In the manufacture of housings of valves plastic is used, which for example is extruded in a mould to form the desired shape of the housing. Forming a thread is necessary for a screw connection of a pipe or conduit, whereby the positioning of the thread directly in the plastic sleeve of the housing often does not fulfill the necessary properties, especially the resistance of tear out. Therefore, it is known to use threaded inserts made from metal with respect to plastic sleeves of housings made of plastic in order to locate the thread in the metal insert.

A connection piece of the type mentioned above is known from DE 34 43 079 A1. The housing consists of plastic and comprises a plastic sleeve or an equivalent part made from the plastic of the housing, whereby a threaded plug made of metal is arranged in the plastic sleeve. The threaded plug is fixedly located in the plastic sleeve. The insert containing the thread is to be positioned in the mould for the manufacture of the housing and is firmly anchored by the plastic extruded into the mould. The metal insert ends in the end wall of the plastic sleeve, thus, there is no possibility for the supply of a tool at the insert. Such a supply is not intended because the insert is already firmly arranged in the plastic sleeve. In connecting a pipe the fitting of the pipe is screwed into the threaded insert of the sleeve. Normally, a seal must be compressed during this screwing operation. This seal is located in the region of the end wall of the plastic sleeve and seals the gap between the insert and the plastic sleeve. Compressing this axial seal during the screwing operation subjects the threaded insert to a torsional stress. When embedding the insert during the extrusion of the plastic, a stress limit is set in the arrangement of the insert in the plastic sleeve, which must not be exceeded during the mounting of the pipe. However, this stress limit of the plastic often is exceeded if the mounting of the pipe is made without the necessary sensitivity. On the other hand it is possible that the seal does not fulfill its sealing function if the stress limit is not exceeded, making it necessary to increase the torsional forces in order to reach the pressure sealing conditions. There is the danger of loosening the insert in the plastic sleeve of the housing. In this case the housing is defective and cannot be used any more. It is neither possible to compress the seal more nor to unscrew the fitting. In addition, there is the danger of damaging the plastic sleeve, if the mounting of a pipe is performed without sufficient sensitivity. The plastic sleeve gets radially extending tears. The connection cannot be used.

SUMMARY OF THE INVENTION

The invention is concerned with a connection assembly for the connection of a pipe to a plastic housing of a valve, whereby under the screwing action of the rotational movement of the fitting of the pipe an unavoidable torsional force occurs. The invention is not concerned with push-pull connections having no torsional forces at all.

It is the object of the invention to provide a connection piece comprising a plastic sleeve and a threaded plug made from metal, in which the plastic sleeve is no longer subjected to the tortional stress normally unavoidable during mounting operation of a pipe.

According to the invention this object is achieved by providing a connection assembly of the described art, wherein the threaded plug only is secured in an axial manner and freely rotatable beared in the plastic sleeve by the connection of the circumferential projection and the corresponding circumferential groove, and wherein the threaded plug is provided protruding from the plastic sleeve to the outside and comprises a gripping surface for the supply of a tool.

The invention starts with the idea—contrary to the prior art to locate the threaded plug in the plastic sleeve no longer in a firm manner but to bear it freely rotatable, thus, avoiding any loading of the plastic sleeve by torsional stresses via the threaded plug. The threaded plug is secured only in axial direction in the plastic sleeve. The threaded plug is provided with a gripping surface in the region of its flange protruding from the plastic sleeve in order to hold the threaded plug during the mounting of the fitting of the pipe in an unrotatale manner and to subject the threaded plug only to the unavoidable torsional stresses created by the rotational movement of the fitting of the pipe to be mounted. Thus, only the threaded plug is loaded with this torsional moment but not the plastic sleeve. The plastic sleeve is kept free of such torsional stresses by this construction. Comparing the subject of the invention with the prior art it seems to be strange and surprising to arrange the threaded plug freely rotatable.

In principle it does not matter on which of the parts the circumferential projection and the circumferential groove respectively are located. The projection has to be arranged on the one part and the groove on the other part. There may be provided a number of projections and grooves adapted to each other in the connection.

It is of special advantage if the circumferential projection and the circumferential groove at the point of the connection between the plastic sleeve and the threaded plug have a small height and depth in a manner so that the threaded plug may be axially introduced into the plastic sleeve under widening in its elastic area. In a first stage the housing including the sleeve is manufactured from plastic. After cooling the threaded plug is pressed into the plastic sleeve. The small height and depth respectively have an advantageous effect on the moulding of the housing with the sleeve. It is not necessary to use divided cores in the mould, instead the removal from the mould can be performed in the elastic region. During mounting of the threaded plug into the plastic sleeve the plastic material is stressed in the region of elastic widening and shortening. Preferably the circumferential projection is provided with an inclined surface in order to facilitate the introduction of the threaded plug. It is possible also to insert the threaded plugs in the mould during the forming of the housing including the sleeve and to have the plugs embedded. In doing this care must be taken not to reach a firm connection between the threaded plug and the plastic sleeve. The free rotatability must be maintained. For example, this may be obtained by the use of a separating agent for a period of time acting on the surface of the threaded plug.

A seal may be provided between the threaded plug and the plastic sleeve. A radially compressed seal is of special effect, which prevents the free rotatability as little as possible. However, an axially compressible seal may be used also.

It is advantageous if the threaded plug is designed in a stepwise manner and the seal is located on a smaller diameter than the circumferential projection and the circumferential groove. Thus, the acting area of the threaded plug, biased with respect to connected pipes under pressure, is advantageously small so that the connection of the projection and the groove in the axial direction is minimally stressed.

Seals may be used in the form of normal O-rings, which have to be inserted in circumferential grooves. But it is also possible to form a seal on the plastic sleeve during its manufacture. The seal may have the shape of a lip seal the elasticity of which is sufficient to provide the necessary sealing effect.

The threaded plug may comprise a flange in its region protruding the plastic sleeve and the flange may carry the gripping surface and may have an outer diameter, which corresponds to the outer diameter of the plastic sleeve. Thus, at the same time a possibility of monitoring is created in order to check the proper mounting of the threaded plug in the plastic sleeve.

The threaded plug may comprise a circumferential extension surrounding the plastic sleeve. The circumferential extension has the circumferential projection or the circumferential groove on its inner diameter, while the corresponding circumferential groove or the circumferential projection is located on the outer diameter of the plastic sleeve. The connection of the two parts is performed here on the outside of the plastic sleeve. This design avoids problems based on heat acting on the construction.

The plastic sleeve may be designed in a slitted manner and a security element may be provided for holding together the slitted plastic sleeve. This design will be used with respect to a small diameter of the plastic sleeve and the pipe to be connected and/or if the plastic material of the housing and the sleeve is of low elasticity. The slitting encourages the mounting and the introduction of the threaded plug. The security element then holds together the parts.

The plastic sleeve may be provided with a leakage channel leading from the seal to the atmosphere. For purpose of easy insertion of the threaded plug into the plastic sleeve the parts may be lubricated, thus, a pneumatic sealing effect may be obtained especially with respect to small clearances favoring the sealing effect of the sealing ring. The leakage channel during a checking operation easily monitors whether the seal performs its sealing function or not.

BRIEF DESCRIPTION OF THE DRAWINGS

Different embodiments of the invention are described and explained in detail, which show that.

DETAILED DESCRIPTION

Figure 1:
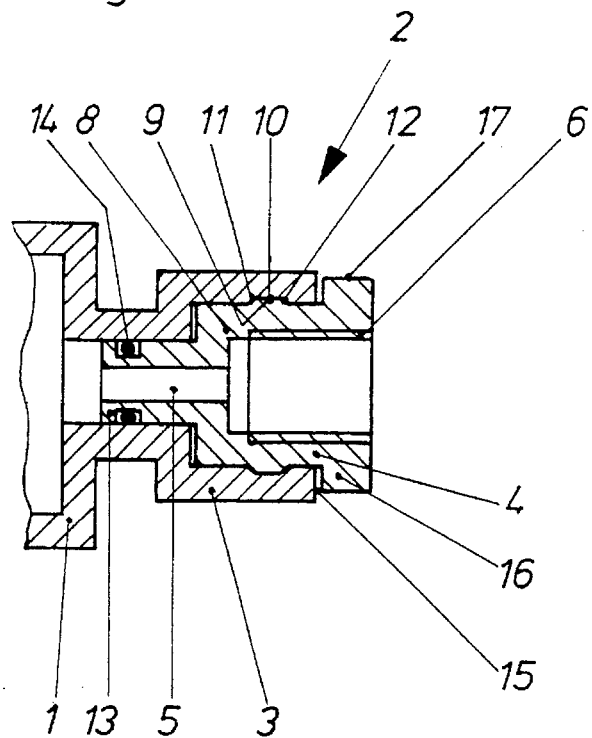
FIG. 1 is a cross-sectional view of a first embodiment of a connection piece of a housing.
Figure 2:
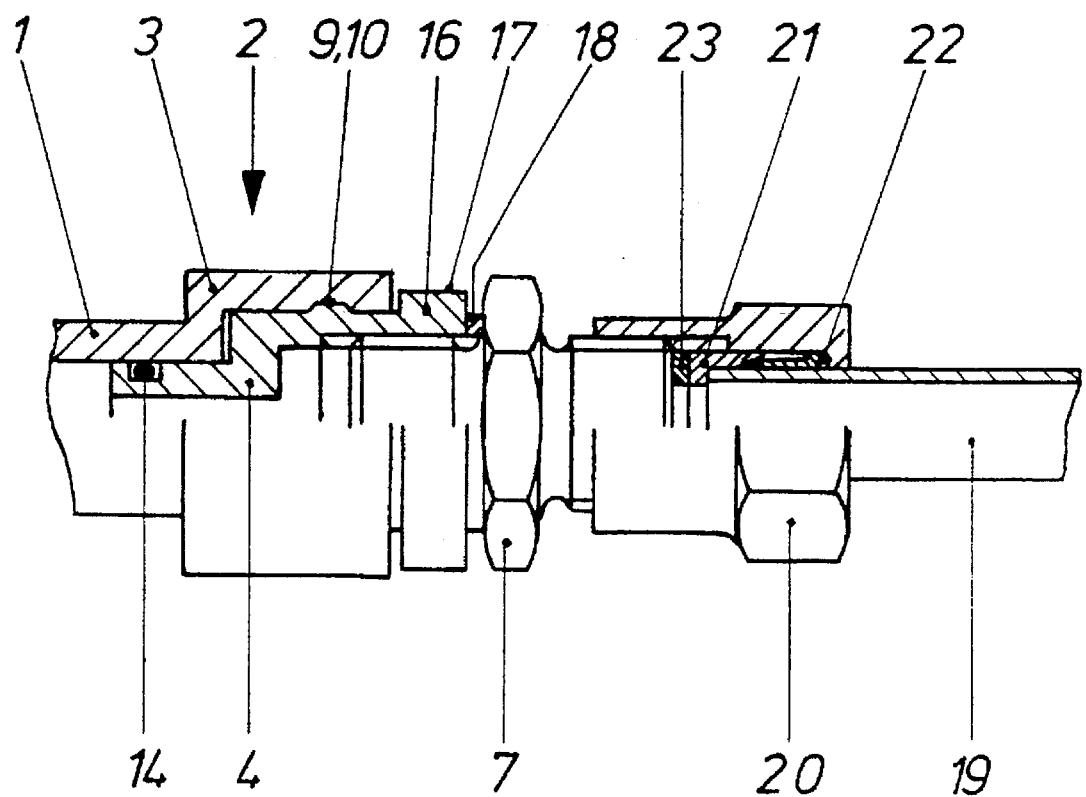
FIG. 2 is a view partly in section of the connection piece and the other parts serving for the connection of a pipe.

Referring now in more detail to the drawings, in which like numerals indicate like parts throughout the several views, a part of a housing 1 of a valve, for example a leveling valve, is illustrated in FIG. 1. The housing 1 consists of plastic and comprises at least one connection piece 2. The connection piece 2 has two parts and comprises a plastic sleeve 3 and a threaded plug 4. The plastic sleeve 3 is made of plastic and especially as one part with the housing 1. However, the threaded plug 4 is made of metal and has the shape of a hollow bushing and has a elongated passage 5 therethrough for providing for the flow of a fluid, especially compressed air, if operated in connected condition. The threaded plug 4 is provided with a thread 6 for the connection with a fitting 7 (FIG. 2). The threaded plug 4 has a circumferential projection 9 in form of a rim, a rib or similar in its middle region 8. A circumferential groove 10 corresponds to the projection 9 and is located in the area of the inner diameter of the plastic sleeve 3. The circumferential projection 9 and the circumferential groove 10 are adapted to each other with respect to their axial positioning so that the proper relative arrangement of the threaded plug 4 in the plastic sleeve 3 is performed if the threaded plug 4 is pushed or pressed into the plastic sleeve 3 in a snapping motion after elastic widening. It is important, that the threaded plug 4 is fixed in the plastic sleeve 3 by the connection of the circumferential projection 9 and the circumferential groove 10 of the parts being coupled only with respect to the axial direction. The threaded plug 4 can freely rotate in the plastic sleeve 3. The height and the depth of the circumferential projection 9 and the circumferential groove 10 in radial direction is only small in a manner so that the threaded plug 4 can be pressed into the plastic sleeve 3 after the manufacture of the housing 1. The circumferential projection 9 is provided with an inclined surface 11 to facilitate the mounting of the parts. The axial fixing of the threaded plug 4 in the plastic sleeve 3 is performed by an undercut surface 12, which may be positioned in an inclined up to a radial manner. An inclined arrangement makes the housing 1 with the plastic sleeve 3 easier to be removed from the mould without using a splitted core.

The threaded plug 4 comprises a stepped elongation 13 facing the interior of the housing 1 and having a reduced diameter with respect to the middle region 8. There is a seal 14, which may have the shape of an O-ring being positioned in a circumferential channel on the surface of the elongation 13. The connection is pressure sealed by the seal 14. The seal 14 is compressed in radial direction and thus performes its sealing function. It would be possible also to locate the seal at the point of transition between the middle region 8 and the elongation 13 and to compress the seal in axial direction to perform the sealing function.

The threaded plug 4 protrudes to the outside and more than the radial surface 15 of the plastic sleeve 3. In this protruding portion the threaded plug 4 is provided with a flange 16 having a gripping surface 17 adapted to be grasped by a tool in order to rotate or hold the threaded plug. Especially the gripping surface 17 may have a hexagonal shape. By this gripping surface 17 the threaded plug 4 can be rotated in the plastic sleeve 3 or its rotation can be prevented by holding.

FIG. 2 shows all parts and illustrates the whole connection. The threaded plug 4 is pressed into the plastic sleeve 3 of the housing 1 and thus rotatably beared. The threaded plug 4 is fixedly held by the aim of the gripping surface 17 and thus rotation is prevented. A sealing ring 18 from aluminum is positioned on the fitting 7, which is screwed into the threaded plug 4 being prevented from rotating by the aim of a tool. At the end of the screwing action a pressure sealed connection results in the region of the sealing ring 18. Finally, the connection serves for joining with a pipe 19, which may be a tube. A swivel nut 20, a pressure ring 21 and a cutting ring 22 are used in known manner, whereby a further sealing ring 23 is added. In this region of the parts all is prior art and no description is needed. But it is important to see that the plastic sleeve 3 is not subjected to any force based on torsion, which occurs by rotating the fitting 7 and holding the threaded plug 4. The plastic sleeve 3 is not stressed and during mounting there is no danger of damage to the plastic sleeve 3 and/or the threaded plug 4 even if a high torsional force has to be transmitted.

Figure 3:
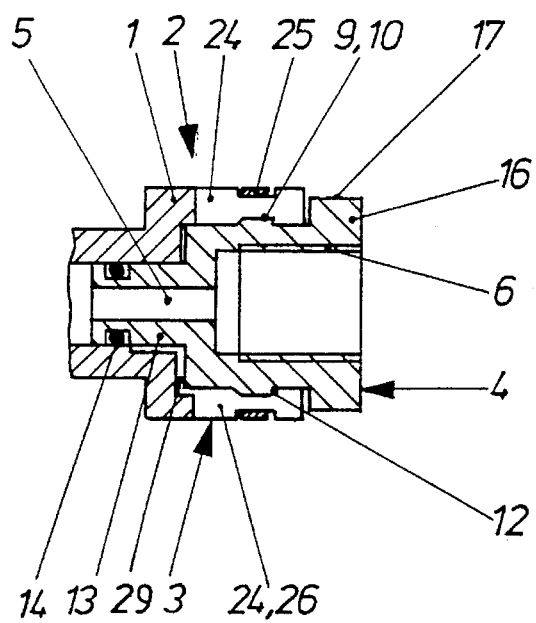
FIG. 3 is a cross-sectional view of a further embodiment of the connection piece.

In the embodiment of FIG. 3 and different from the embodiment of FIG. 1 the undercut surface 12 is located in a radial manner. The plastic sleeve 3 is provided with a plurality of slits 24 arranged in axial direction so that the plastic sleeve 3 has an increased flexibility. Thus, the introduction of the threaded plug 4 into the plastic sleeve 3 is easier and more simple. The slitted parts of the plastic sleeve will widen in the elastic area. The elastic widening performed by this slitted construction is used especially with respect to minor diameters. A security element 25, especially in the form of a clip, a band clamp fitting or similar, which holds together the slitted parts of the plastic sleeve 3, is provided in order to axially fix the threaded plug 4 in the plastic sleeve 3 after introduction. The security element 25 will be mounted after the introduction of the threaded plug 4 into the plastic sleeve 3. In addition, the slits 24 may form a leakage channel 26 or a plurality of leakage channels 26 leading from the outside of the seal 14 to the atmosphere via a groove 29 elongating axially and radially. Thus, intentionally a solution is created in order to have an exhaust when pressurized with respect to a defective seal 14 to be able to monitor the defect and to remove it.

Figure 4:
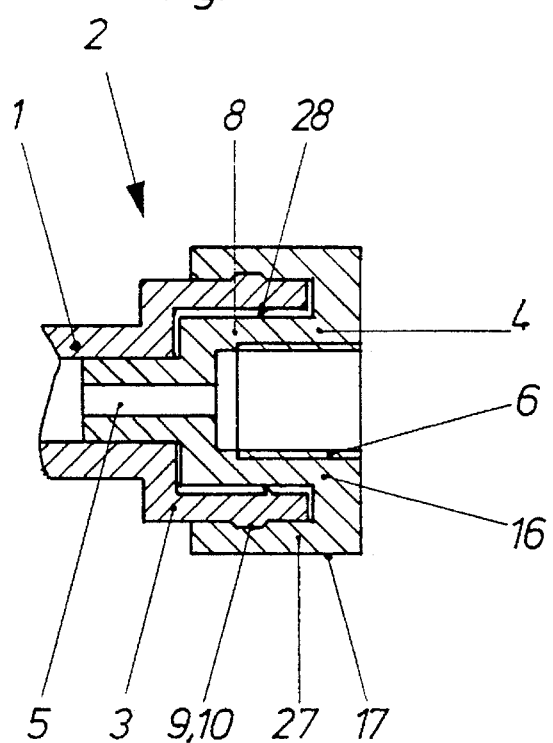
FIG. 4 is a cross-sectional view of a further embodiment of the connection piece and FIG. 5 is a cross-sectional view of a final embodiment of the connection piece.

The embodiment of the connection piece 2 illustrated in FIG. 4 comprises the special fact that the flange 16 of the threaded plug 4 is provided with an extension 27, which surrounds the plastic sleeve 3 at a region of its outside, in which the circumferential projection 9 and the circumferential groove 10 are provided. The circumferential projection 9 here is located on the outside of the plastic sleeve 3, while the circumferential groove 10 is positioned in the region of the inner diameter of the extension 27 of the threaded plug 4. The plastic material of the plastic sleeve 3 is surrounded by the metal of the threaded plug 4 so that under the action of temperature there is no danger that the connection of the parts can be loosened in the region between the circumferential projection 9 and the circumferential groove 10. The plastic sleeve 3 has the further advantage, that during its manufacture a lip seal 28 is formed, which serves for the function of the seal 14. The lip seal 28 contacts the middle region 8 of the threaded plug 4 during the introduction of the threaded plug 4 into the plastic sleeve 3.

Figure 5:
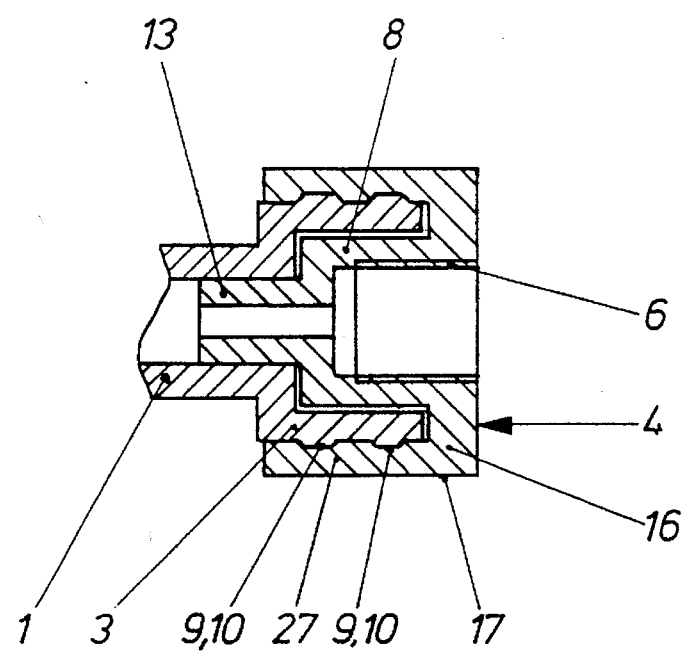

According to the embodiment of FIG. 5 the extension 27 is still more elongated in the direction to the housing 1. In this region there are axially positioned two connecting points of circumferential projections 9 and circumferential grooves 10 one beside the other. A certain type of labyrinth seal is formed at the same time, thus, a seal 14 or a lip seal 28 may be avoided. Disadvantageously the seal is located on a relatively large diameter so that the threaded plug 4 is accordingly subjected to stresses when operated under pressure.

While the foregoing description sets forth the preferred embodiments of the invention, it will be understood by those skilled in the art that variations and modifications of the invention can be made without departing from the spirit and scope of the invention, as set forth in the following claims.

| LIST OF REFERENCE NUMERALS |
| --- |
| 1-housing |
| 2-connection piece |
| 3-plastic sleeve |
| 4-threaded plug |
| 5-bore |
| 6-thread |
| 7-fitting |
| 8-middle region |
| 9-projection |
| 10-groove |
| 11-inclined surface |
| 12-undercut surface |
| 13-elongation |
| 14-seal |
| 15-radial surface |
| 16-flange |
| 17-gripping surface |
| 18-sealing ring |
| 19-pipe |
| 20-swivel nut |
| 21-pressure ring |
| 22-cutting ring |
| 23-sealing ring |
| 24-slit |
| 25-security element |
| 26-leakage channel |
| 27-extension |
| 28-lip seal |
| 29-groove |

We claim:
1. A connector assembly for connecting a pipe to a plastic housing:

said housing including a sleeve extending therefrom, said sleeve defining a passage therethrough for the flow of fluid with respect to said housing;

said sleeve having a small diameter neck portion adjacent said housing and a larger diameter body portion of a breadth greater than said neck portion extending from said neck portion away from said housing;

said passage through the neck portion of said sleeve comprising a neck passage being of small diameter, and through the larger body portion comprising a body portion passage being of larger diameter than said neck passage, and a right angle shoulder formed between said neck passage and said body portion passage;

a connector plug sized and shaped to be partially inserted into the passage of said sleeve and defining a passage therethrough for coupling a pipe to said sleeve;

said connector plug including an elongation of a small external breadth sized and shaped to be received in the neck passage of said sleeve, and including a middle region of greater external breadth than said neck portion and sized and shaped to be received in the passage through said larger body portion of said sleeve for insertion into said sleeve and into juxtaposition with said right angle shoulder, and including an external flange for protruding from said sleeve;

said middle region of said connector plug and the larger body portion of said sleeve including means for rotatably retaining said plug in said sleeve;

said passage through said plug comprising an elongation passage through said elongation and being of small diameter and comprising a middle region passage through said middle region and through said external flange being of larger diameter than said elongation passage, and a right angle shoulder formed between said elongation passage and said middle region passage;

the middle region passage of said connector plug defining connector thread means extending from said flange and through said middle region toward said shoulder;

so that an end portion of a pipe can be inserted into the connector thread means of the middle region passage of the plug and the plug can be engaged at its external flange and rotated with respect to both the housing and the pipe for threaded connection to the plug, and in response to rotation of the plug the end portion of the pipe is moved into the plug and into the sleeve and abuts the right angle shoulder of the plug.

2. The connector assembly of claim 1, wherein said means for rotatably retaining said plug in said sleeve comprises at least one circumferential projection and at least one circumferential groove, said circumferential projection sized and shaped to be received in said circumferential groove when said plug is inserted into the passage of said sleeve.

3. The connector assembly of claim 2, wherein said circumferential groove is disposed along an inner surface of the body portion of said sleeve, and wherein said circumferential projection is disposed along an exterior surface of the middle portion of said plug.

4. The connection assembly of claim 2, wherein said external flange of said plug comprises a circumferential extension extending from the flange back toward said elongation of said plug thereby forming a gap between said extension and said middle portion of said plug for receiving said neck portion of said sleeve when said plug is inserted into said sleeve, said circumferential groove being disposed along an interior surface of said extension and said circumferential projection being disposed along an exterior surface of the body portion of said sleeve.

5. The connector assembly of claim 2, wherein said circumferential projection includes an inclined surface for facilitating the insertion of said plug into said sleeve.

6. The connector assembly of claim 2, wherein said circumferential groove includes an undercut surface for permitting the removal of said plug from said sleeve.

7. The connector assembly of claim 1, wherein said connector thread means comprises a helical coupling.

8. The connector assembly of claim 1, wherein said external flange includes a gripping surface for being grasped when the pipe is inserted into the connector thread means of the passage of the plug.

9. The connector assembly of claim 1, further comprising a seal positioned between said plug and said sleeve.

10. The connector assembly of claim 1, further comprising a security element removably attached to said body portion of said sleeve having axial slits therethrough, said security element for reinforcing said sleeve thereby preventing the removal of said plug from said sleeve.

11. The connector assembly of claim 1, further comprising a leakage channel extending between said plug and said sleeve for the detection of leaks.

* * * * *